United States Patent
Kolesnik et al.

(10) Patent No.: US 11,169,901 B2
(45) Date of Patent: Nov. 9, 2021

(54) STORAGE-BASED LOG FILE MANAGEMENT

(71) Applicant: Red Hat, Inc., Raleigh, NC (US)

(72) Inventors: Michael Kolesnik, Netanya (IL); Mordechay Asayag, Netanya (IL)

(73) Assignee: Red Hat, Inc., Raleigh, NC (US)

( * ) Notice: Subject to any disclaimer, the term of this patent is extended or adjusted under 35 U.S.C. 154(b) by 165 days.

(21) Appl. No.: 16/404,120

(22) Filed: May 6, 2019

(65) Prior Publication Data
US 2020/0356460 A1   Nov. 12, 2020

(51) Int. Cl.
| | |
|---|---|
| *G06F 11/00* | (2006.01) |
| *G06F 11/34* | (2006.01) |
| *G06F 12/02* | (2006.01) |
| *G06F 11/30* | (2006.01) |
| *G06F 11/07* | (2006.01) |

(52) U.S. Cl.
CPC ...... *G06F 11/3476* (2013.01); *G06F 11/0766* (2013.01); *G06F 11/3034* (2013.01); *G06F 12/023* (2013.01)

(58) Field of Classification Search
CPC .......................... G06F 12/023; G06F 11/3476
See application file for complete search history.

(56) References Cited

U.S. PATENT DOCUMENTS

| | | | | |
|---|---|---|---|---|
| 9,471,237 | B1* | 10/2016 | Dass | G06F 11/3409 |
| 9,529,809 | B2* | 12/2016 | French | G06F 16/21 |
| 10,212,023 | B2 | 2/2019 | Brown | |
| 10,216,429 | B2 | 2/2019 | Ash et al. | |
| 2004/0230763 | A1* | 11/2004 | Cohen | G06F 11/3466 711/170 |
| 2008/0208530 | A1* | 8/2008 | Kumanan | G06F 11/3476 702/182 |
| 2009/0157767 | A1* | 6/2009 | Doty | G06F 11/0751 |
| 2015/0112935 | A1* | 4/2015 | French | G06F 3/0608 707/639 |
| 2018/0150231 | A1 | 5/2018 | Hanyu | |
| 2020/0242084 | A1* | 7/2020 | Nguyen | G06F 3/067 |

FOREIGN PATENT DOCUMENTS

| | | |
|---|---|---|
| CN | 102799514 B | 2/2017 |
| CN | 106815124 A | 6/2017 |
| CN | 106815363 A | 6/2017 |
| JP | 5509704 B2 | 6/2014 |

OTHER PUBLICATIONS

"Managing Logs with Logrotate," Fideloper LLC, Mar. 11, 2014, http://serversforhackers.com/c/managing-logs-with-logrotate.

\* cited by examiner

*Primary Examiner* — Jonathan D Gibson
(74) *Attorney, Agent, or Firm* — Kilpatrick Townsend & Stockton LLP

(57) ABSTRACT

A process in a system can monitor available free storage space on a storage device, and, based on preset log file parameters, can act upon log files being stored on or written to the storage device to keep the storage device from running out of storage space due to excessive logging. The process monitors the device free space as reported by the file system to determine space utilization. A threshold of free space can be specified as a parameter. A log file action can also be specified as a parameter and is an action designed to reduce the space being used by a log file or log files. Once the process recognizes that the free space is under the threshold it will perform the configured action.

20 Claims, 4 Drawing Sheets

STORAGE-BASED LOG FILE MANAGEMENT

TECHNICAL FIELD

The present disclosure relates generally to log files. More specifically, but not by way of limitation, this disclosure relates managing storage space for event log files, such as those log files used to record error events or processing events related to an operating system, service, or application.

BACKGROUND

Operating systems provide for the creation and storage of log files. Log files are used to record events. These events, as examples, may take place during the execution of an operating system service, an application, or an external service. Such event log files can be used to provide an audit trail to be referred to in the future to diagnose problems, or to enable an understanding of how the computer system operates over time. In some circumstances, a service can generate large numbers of log entries in a relatively short amount of time, for example, if the service encounters a problem executing that causes it to experience large numbers of errors.

DETAILED DESCRIPTION

Figure 1:
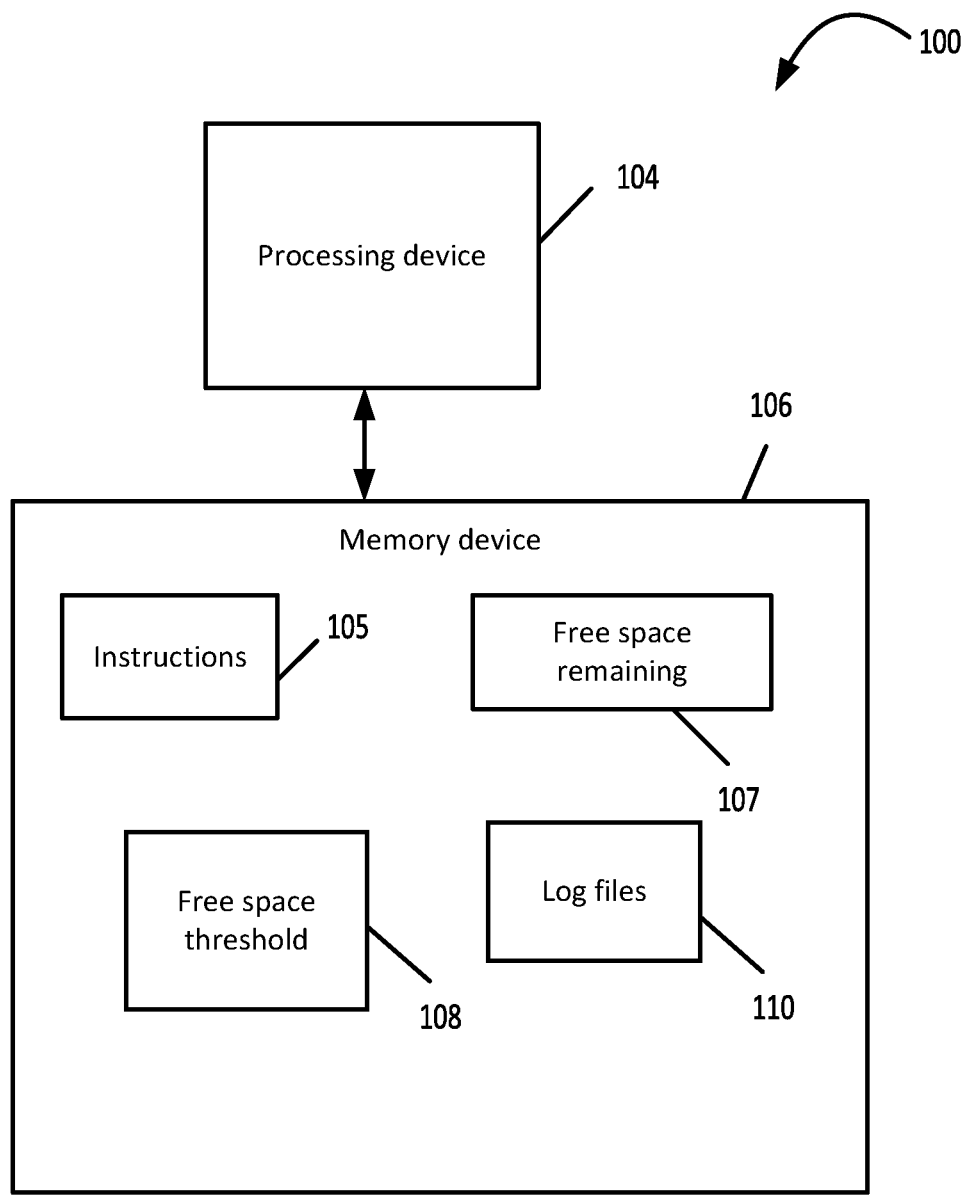
FIG. 1 is a block diagram of an example of a system that provides storage-based log file management according to some aspects of the disclosure.

Event logs can be used to provide an audit trail to be referred to in the future to diagnose problems, or for other purposes. When a system runs, a service or application might start generating large event log files or large numbers of log files due to a persistent error or other problem. The log files can become undesirably large or large numbers of log files might be generated in a relatively short period of time. While storage space on workstations and servers has steadily increased with the complexity of software, storage space for other types of computer systems can be limited. Cloud storage is costly and there is a desire on the part of most users to minimize expense. Embedded systems are often designed to minimize cost, space, or power consumption, meaning storage space must be limited. Such a system might run out of storage space and stall due to extensive logging, adversely affecting multiple services and applications, and possibly requiring immediate attention. Low storage space can also prevent memory swapping, slowing performance.

Some examples of the present disclosure overcome one or more of the issues mentioned above by providing a process that monitors free space on a storage device, and based on preset log file parameters, can act to reduce the space being occupied by log files in case the device the log files are being stored on or written to comes close to running out of storage space. Log file parameters can specify the log file location or service being used and identify on which device the log resides. The process then monitors the device free space as reported by the file system to identify the space utilization. A threshold of free space can be specified as one of the log file parameters. A log file action can also be specified as one of the log file parameters and is an action designed to reduce the space being used by a log file or log files. Once the system recognizes that the free space is under the threshold it will perform the configured action.

As an example, a processing device in a system can monitor free space for at least one storage device while at least one log file is residing on or being written to the storage device. The processing device can compare the free space for the storage device to a free space threshold and execute at least one log file action when the free space for the storage device falls below the free space threshold.

In some examples, log file storage parameters are set by a user through a user input device. The log file storage parameters may include the free space threshold and at least one log file action. The log file storage parameters can also include a log file identifier or identifiers, a log file directory, a log file priority, or any combination of these. In some examples a log file action includes log file deletion, log file rotation, log file write prevention or any combination of these. In some examples the log file action includes rotating a log file to produce a closed log file and then compress the closed log file.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for storage-based log file management. The system 100 includes the processing device 104 that can execute computer program code, also referred to as instructions, program code, or program code instructions 105. The computer program code is executable for performing operations as described herein. Processing device 104 is communicatively coupled to the memory device 106. The processing device 104 can include one processing device or multiple processing devices. Non-limiting examples of the processing device 104 include a field-programmable gate array (FPGA), an application-specific integrated circuit (ASIC), a microprocessor, an embedded processor, a digital signal processor, etc. The processing device 104 can execute one or more operations for storage-based log file management.

Still referring to FIG. 1, memory device 106 can include one memory device or multiple memory devices. The memory device 106 can be non-volatile and may include any type of memory device that retains stored information when powered off. In some examples, at least some of the memory device can include a non-transitory computer-readable medium from which the processing device 104 can read instructions 105. A computer-readable medium can include electronic, optical, magnetic, or other storage devices capable of providing the processing device with computer-readable instructions 105 or other program code.

The memory device 106 can also include a stored value 107 for free space remaining in memory device 106, and a stored value 108 for a free space threshold for memory device 106. In this example, memory device 106 also stores the log file 110, as might be the case in the example where system 100 is an embedded system, where storage may be limited to minimize cost and power consumption. Storage on a mobile device may be limited for similar reasons.

Figure 2:
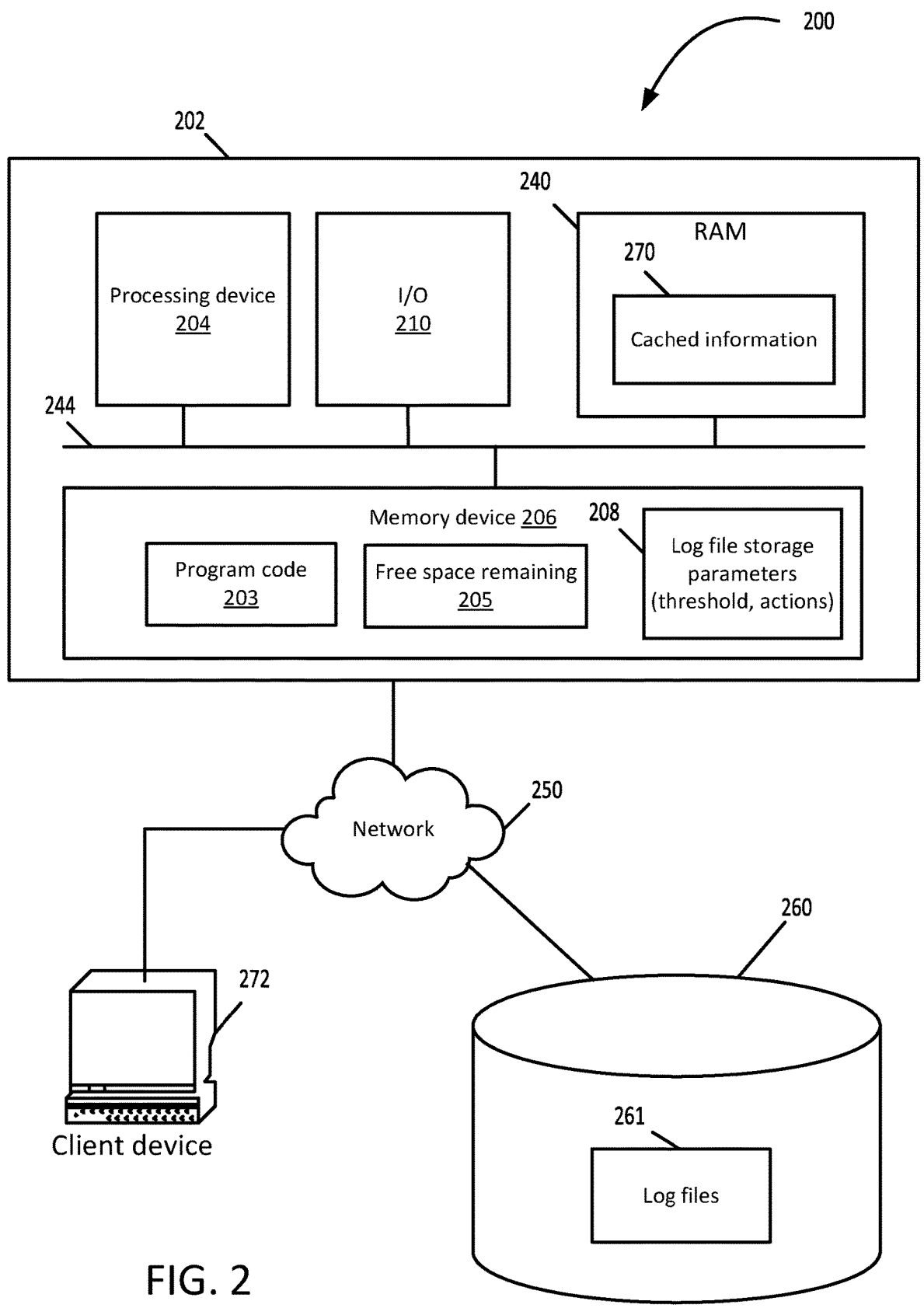
FIG. 2 is a block diagram of another example of a system that provides storage-based log file management according to some aspects of the disclosure.

FIG. 2 is a block diagram of an example of a system 200 that provides storage-based log file management. The system 200 is implemented by computing device 202 and includes a processing device 204 that can execute computer program code 203, also referred to as instructions or program code instructions, for performing operations related to storage-based log file management. The system 200 monitors free space on the storage system used by log files maintained remotely on a network 250, such as in the case of a system using cloud-based storage. Processing device 204 is communicatively coupled to a memory device 206. The processing device 204 can include one processing device or multiple processing devices. Non-limiting examples of the processing device 204 include a field-programmable gate array (FPGA), an application-specific integrated circuit (ASIC), a microprocessor, etc.

The processing device 204 can execute one or more operations for storage-based log file management. The processing device 204 can execute program code 203 stored in the memory device 206 to perform the operations. In some examples, the instructions 203 include processor-specific instructions generated by a compiler or an interpreter from code written in any suitable computer-programming language, such as C, C++, C#, Python, etc. Computing device 202 also includes an input/output (I/O) module or modules 210, and a random access memory (RAM) 240. A bus or interconnect 244 is also provided to allow for inter- and intra-device communications using, for example, I/O module 210.

Memory device 206 can include one memory device or multiple memory devices. The memory device 206 can be non-volatile and may include any type of memory device that retains stored information when powered off. Non-limiting examples of the memory device 206 include electrically erasable and programmable read-only memory (EEPROM), flash memory, or any other type of non-volatile memory. In some examples, at least some of the memory device can include a non-transitory computer-readable medium from which the processing device 204 can read instructions 203. A computer-readable medium can include electronic, optical, magnetic, or other storage devices capable of providing the processing device with computer-readable instructions 203 or other program code. Non-limiting examples of a computer-readable medium include magnetic disk(s), memory chip(s), ROM, random-access memory (RAM), an ASIC, a configured processor, optical storage, or any other medium from which a computer processor can read instructions 203.

The memory device 206 can also include one or more files. For example, memory device 206 can serve as a storage device for the value of free space remaining 205, and log file storage parameters 208. These stored values can be used to monitor free space on a cloud-based virtual storage device 260 as log files 261 are being written over network 250 through I/O module 210, which can include a network interface (not shown). Thus, in system 200 of FIG. 2, memory device 206 serves as a first storage device including the instructions 203 and storage device 260 serves as a second storage device to which a log file is written. In other examples, additional log files can be written to memory device 206. Any of the log files can be written by an operating system process, an application, a service, and any of these can be running in a virtual machine. Stored values for free space remaining and log file parameters can be temporarily retained in RAM 240 as cached information 270 for faster access by processing device 204. Log file storage parameters and a log file action or actions can be specified by a user through a user interface in client device 272. Log file storage parameters 208 can include log file storage parameters and actions as well as the log file identifier and log file directory for log file 261.

For convenience, the term memory device has been used in parts of the description to refer to the storage device that is local to the computing device executing the log file management process, while the term storage device has been used parts of the description to refer to the storage device where event log files are recorded. However, these terms as used in this description can refer to either volatile or non-volatile storage devices, to either physical or virtual storage devices, and to storage devices based on any type of media, including, but not limited to those based on electronic circuitry, organic materials, magnetic materials, or optical materials.

Figure 3:
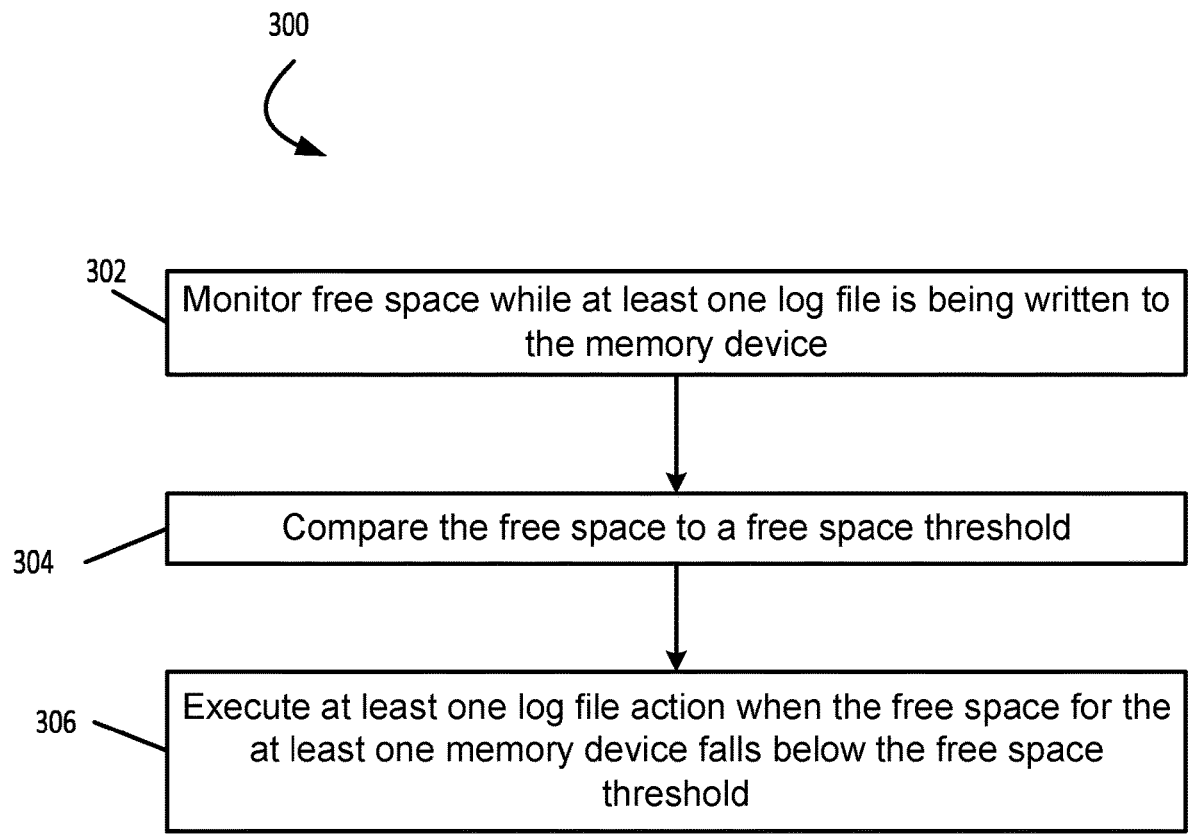
FIG. 3 is a flowchart of an example of a process for providing storage-based log file management according to some aspects of the disclosure.

In some examples, a computing device such as processing device 104 can perform one or more of the operations shown in FIG. 3 to provide storage-based log file management. In other examples, the computing device can implement more operations, fewer operations, different operations, or a different order of the operations depicted in FIG. 3. Process 300 of FIG. 3 is described below with reference to components discussed above.

In block 302 of FIG. 3, the processing device 104 monitors the free space available in memory device 106 while at least one log file 110 is stored on the memory device. As an example, free space can be periodically checked by the service that is monitoring log file space utilization issuing a command through the operating system that returns the space remaining on the storage device of interest. In Linux, as an example, the "df" command can be used.

At block 304, the remaining free space is compared to a free space threshold 108 that is predetermined and stored. As examples, the free space threshold can be specified as a percentage of total space of the storage device being free, or a certain amount of space needing to remain free, such as a certain number of megabytes or gigabytes of the available storage space of the storage device being free. At block 306, processing device 104 executes at least one log file action in response to detecting that the free space for memory device 106 is below the free space threshold 108.

Figure 4:
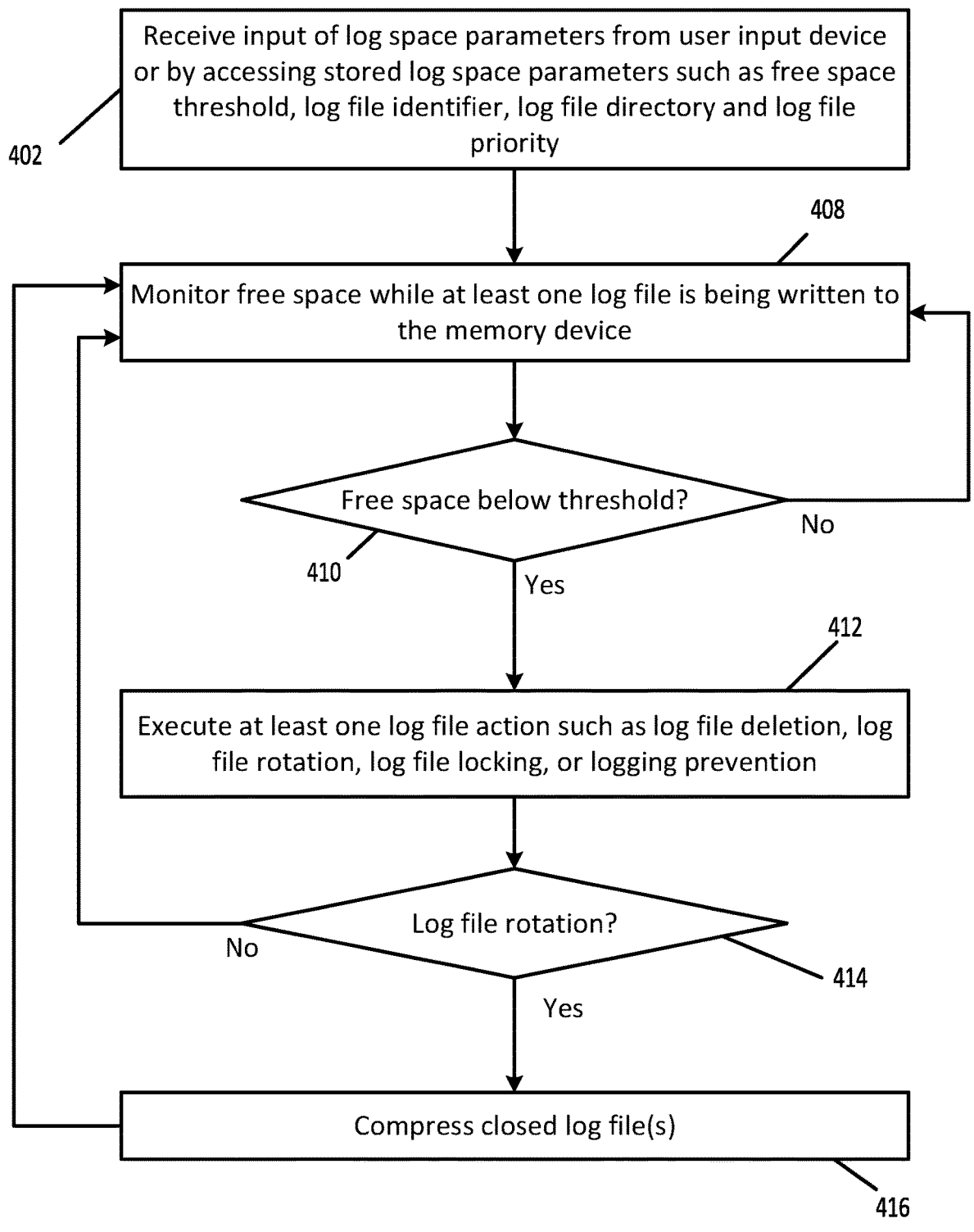
FIG. 4 is a flowchart of another example of a process for providing storage-based log file management according to some aspects of the disclosure.

As another example, computing device 202 can perform the operations of process 400 of FIG. 4 using processing device 204 to provide storage-based log file management according to some aspects of the disclosure. In other examples, the computing device 202 can implement more operations, fewer operations, different operations, or a different order of the operations depicted in FIG. 4. Process 400 of FIG. 4 is described below with reference to components discussed above.

At block 402, processing device 204 receives, as input, log file storage parameters. The input can be received from a user input device such as client device 272 or can be received by accessing stored log file storage parameters. These log file storage parameters can include, as examples, a free space threshold, a log file identifier, a log file directory, and a log file priority.

The free space threshold has been discussed above. The log file identifier is the file identifier of a log file for which space utilization is to be, at least indirectly, monitored. A log file directory is the name of a directory where the log file or multiple such log files reside. A log file priority may be specified if there are multiple log files being monitored. The log file priority can indicate an order of log files on which log file actions are to be taken when the free space drops below the threshold. The log file priority can, for example, indicate the largest log file is acted on first. Alternatively, the log file priority can specify an order of action based on file names or on when the log file was last written to.

Continuing with FIG. 4, at block 408, processing device 204 monitors free space on storage device 260 while at least one log file 261 is being written to the storage device. For example, in a Linux system, the "df" command can be issued, which will cause the operating system to return a value representing remaining free space.

If the free space is below the free space threshold at block 410, the process can proceed to block 412. In block 412, the processing device 204 executes at least one log file action such as log file deletion, log file rotation, log file locking, or logging prevention. Log file deletion can include deleting older even log files in the specified directory or that correspond to the log file specified by the log file identifier. Log file deletion can also or alternatively include deleting a current event log file and allowing the logging process to start anew. In this example, in addition to these choices, either the log file or the logging commands for the offending process can be locked or stopped. Locking a log file may cause the offending application or service to stop, but the rest of the system will keep operating and have enough storage space. Log file rotation can also be initiated based on the free space available on or in the storage device. Log rotation would otherwise normally be done based on a schedule, based on re-starts of the logging service, or when requested by a user. A combination of the log file actions listed can also be executed by the processing device 204. In some aspects, the log file action or actions can be specified by user input.

Still referring to FIG. 4, if log file rotation was initiated at block 414 in response to the free space remaining on the storage device being below the specified threshold, a closed log file listing event descriptors for events up until the rotation normally results. This closed log file is compressed at block 416 to recover storage space.

Unless specifically stated otherwise, it is appreciated that throughout this specification that terms such as "operations," "processing," "computing," "comparing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel. Terms such as "above," "below," when referring to numerical comparisons can encompass the concept of equality.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
   a processing device; and
   at least one storage device including instructions for an application or service external to an operating system that are executable by the processing device for causing the processing device to perform operations comprising:
   monitoring, by issuing commands to the operating system, free space on the at least one storage device while at least one log file is being written to the at least one storage device by the application or service, the free space configured for use by multiple applications or services;
   comparing the free space on the at least one storage device to a predetermined threshold indicative of storage space to be maintained as free space on the at least one storage device; and
   executing at least one log file action in response to the free space reported by the operating system on the at least one storage device falling below the predetermined threshold.

2. The system of claim 1 wherein the at least one storage device comprises a first storage device including the instructions and a second storage device to which the at least one log file is written.

3. The system of claim 1 wherein the operations further comprise receiving or accessing log file storage parameters, the log file storage parameters including the predetermined threshold and the at least one log file action.

4. The system of claim 3 further comprising a user input device, wherein the log file storage parameters are received through the user input device.

5. The system of claim 3 wherein the log file storage parameters further include at least one of a log file identifier, a log file directory, or a log file priority.

6. The system of claim 3 wherein the at least one log file action includes at least one of log file deletion, log file rotation, or log file write prevention.

7. The system of claim 1 wherein the at least one log file action comprises:
   rotating the at least one log file to produce a closed log file; and
   compressing the closed log file.

8. A method comprising:
   monitoring, by a processing device executing an application or service external to an operating system issuing commands to the operating system, free space on a storage device while at least one log file is being written to the storage device by the application or service, the free space configured for use by multiple applications or services;
   comparing, by the processing device, the free space for the storage device to a predetermined threshold indicative of storage space to be maintained as free space on the storage device; and
   executing, by the processing device, at least one log file action in response to the free space reported by the operating system on the storage device falling below the predetermined threshold.

9. The method of claim 8 further comprising receiving or accessing log file storage parameters, the log file storage parameters including the predetermined threshold and the at least one log file action.

10. The method of claim 9 further wherein the log file storage parameters are received through a user input device.

11. The method of claim 9 wherein the log file storage parameters further include at least one of a log file identifier, a log file directory, or a log file priority.

12. The method of claim 9 wherein the at least one log file action includes at least one of log file deletion, log file rotation, or log file write prevention.

13. The method of claim 8 wherein the at least one log file action comprises:
- rotating the at least one log file to produce a closed log file; and
- compressing the closed log file.

14. A non-transitory computer-readable medium comprising program code for an application or service external to an operating system that is executable by a processing device for causing the processing device to:
- monitor, by issuing commands to the operating system, free space on a storage device while at least one log file is being written to the storage device by the application or service, the free space configured for use by multiple applications or services;
- compare the free space for the storage device to a predetermined threshold indicative of storage space to be maintained as free space on the storage device; and
- execute at least one log file action in response to the free space reported by the operating system on the storage device falling below the predetermined threshold.

15. The non-transitory computer-readable medium of claim 14 wherein the storage device comprises the non-transitory computer-readable medium.

16. The non-transitory computer-readable medium of claim 14 wherein the program code is executable by the processing device for causing the processing device to receive or access log file storage parameters, the log file storage parameters including the predetermined threshold and the at least one log file action.

17. The non-transitory computer-readable medium of claim 16 wherein the program code is executable by the processing device for causing the processing device to receive the log file storage parameters through a user input device.

18. The non-transitory computer-readable medium of claim 16 wherein the log file storage parameters further include at least one of a log file identifier, a log file directory, or a log file priority.

19. The non-transitory computer-readable medium of claim 16 wherein the at least one log file action includes at least one of log file deletion, log file rotation, or log file write prevention.

20. The non-transitory computer-readable medium of claim 14 wherein the at least one log file action comprises:
- rotating the at least one log file to produce a closed log file; and
- compressing the closed log file.

\* \* \* \* \*